Feb. 10, 1948. E. E. ROBERTSON 2,435,847
SHOVEL TOOTH
Filed Jan. 14, 1946

INVENTOR
ELMER E. ROBERTSON
BY
ATTORNEY

Patented Feb. 10, 1948

2,435,847

UNITED STATES PATENT OFFICE 2,435,847

SHOVEL TOOTH

Elmer E. Robertson, Harbor City, Calif.

Application January 14, 1946, Serial No. 641,018

2 Claims. (Cl. 37—142)

This invention relates to a removable tooth for a power shovel bucket.

One object of my invention is to provide a removable tooth and a tooth shank for a power shovel bucket. Another object is to provide a device which permits the rapid and secure fastening of a removable tooth to the tooth shank of a power shovel bucket. Another object is to provide a forged steel tooth with a recess in the rear portion, for attachment to the tooth shank of a power shovel bucket. Still another object is to provide a forged steel tooth which is reversible so that the wear on the two sides may be equalized by remounting the tooth in the shank.

My invention will be understood by the detailed description below, reference being made to the accompanying drawings in which.

Figure 1:
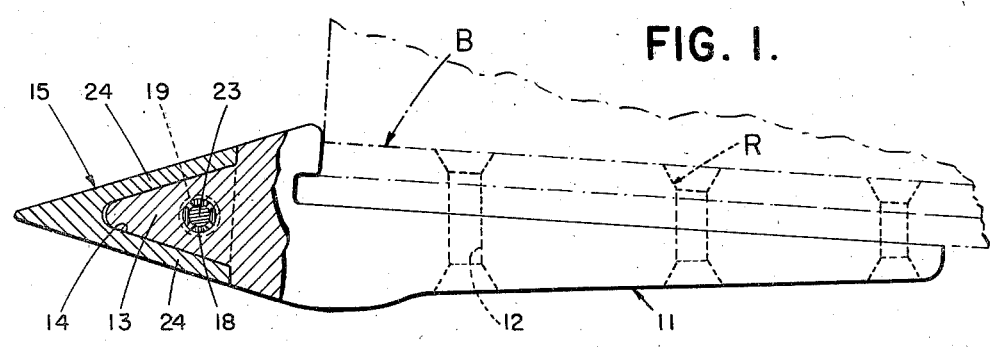
Fig. 1 is a side elevational view showing a removable tooth mounted on the tooth shank.
Figure 2:
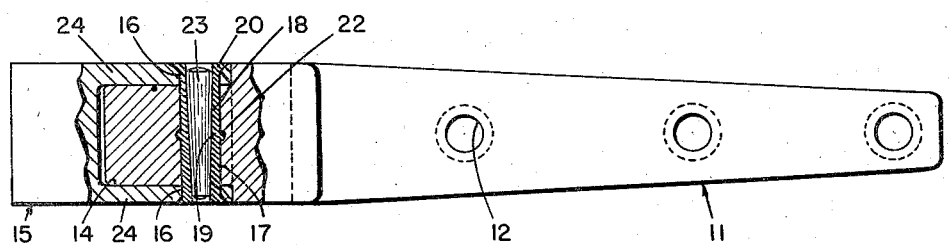
Fig. 2 is a top plan view of the same.
Figure 3:
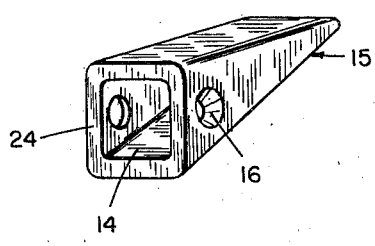
Fig. 3 is a perspective view of the removable portion of the tooth.
Figures 4, 5:
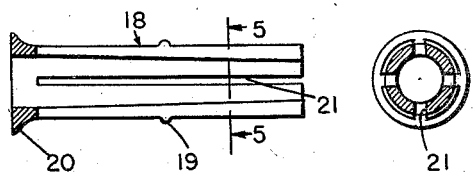
Fig. 4 is a side elevational view partly in section showing the slotted bushing used in mounting the tooth on the tooth shank.
Fig. 5 is a cross-sectional view taken on the line 5—5 of Fig. 4.
Figure 6:
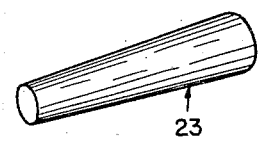
Fig. 6 is a perspective view of the tapered pin.

Referring to the drawings, the tooth shank 11 is adapted to be non-removably attached to the bottom portion of the bucket structure B by means of rivets R in countersunk holes 12 in the rear portion of the shank, and in the bucket structure. The forward portion of the shank is provided with a V-shaped extension 13 which is adapted to fit in a recess 14 in the rear portion of the forged steel tooth 15. The recess 14 in the rear portion of the tooth has side walls 24 which are thick enough to provide secure anchoring of the parts. The tooth 15 may be of any desired shape depending upon the kind of service in which the power shovel bucket is employed. A chisel-shaped tooth is shown, although it will be obvious that a pointed tooth or other shaped tooth may be employed as desired, the invention relating specifically to the means for removably attaching a forged steel tooth to a tooth shank. Since this device is used under the most severe conditions, it is necessary that the tooth structure be very securely fastened to the shank, with no movement between the parts and further, since relatively unskilled labor is ordinarily employed in handling such equipment, the means by which the tooth structure is attached to or detached from the shank must be simple and only require ordinary hand tools which may be readily used in the field.

The removable tooth portion is preferably made as a single piece of forged steel, shaped with the recessed portion at the rear of the tooth for use in making the connection to the shank. The tooth is provided with countersunk holes 16 extending through the forged wall portion 24 on opposite sides of the recess in the position corresponding to the sides of the tooth when applied to the shovel. A hole 17 corresponding in position to the hole 16 in the tooth is provided, a groove 22 being cut in the middle portion of the hole 17 to receive the keying ring 19 of the bushing 18. The bushing 18 is preferably provided at one end with a collar 20 which is adapted to fit in the countersunk holes 16 of the tooth although the bushing may be used without the collar. The bushing is slotted from a position immediately adjacent the collar 20, or near one end if no collar is provided, extending longitudinally to and through the other end, the number of such slots 21 being conveniently four or more, and the slots being sufficiently wide so that the bushing may be pressed through holes 16 in the wall 24 of the tooth and the hole 17 in the shank until the keying ring 19 is engaged in the circumferential groove 22. The inside surface of the bushing 18 is a tapered hole with the large end of the taper adjacent the collar 20, and a tapered pin 23 is provided to be driven into the bushing 18 after it is in place in the holes 16 and 17, thus securely locking the parts together. The recess in the tooth 15 is preferably made to closely fit the extension 13 of the shank 11 so that there will be no freedom of movement between the parts.

In order to remove the tooth 15 from the V-shaped extension 13 of the shank, it is only necessary to drive out the tapered pin 23 and the bushing 18. A new tooth may then be quickly applied or the old tooth may be reversed so that the bottom side is on top, and either the old bushing and pin or new ones may be used to reassemble the parts.

The advantages of my tooth and tooth shank structure will be apparent. The use of a single forging for the removable tooth member provides a very strong wear-resisting member which will give long service under the very severe conditions under which a power shovel bucket is used. The tooth shank with its V-shaped extension 13 remains fixed on the shovel bucket, only the forged tooth portion being removed. The attaching means including the slotted bushing 18 and the tapered pin 23 may be readily installed or removed in the field with very simple tools, and the bushing and pin may be inserted from either side of the tooth.

I claim:

1. A power shovel bucket tooth assembly comprising a tooth shank having means for permanent attachment to a power shovel bucket and provided with a forward extension for attachment to a removable tooth; a wear resisting tooth adapted to be removably attached to the forward extension of said tooth shank, said tooth having a narrowed front portion and an enlarged rear portion, the rear portion being provided with a cavity adapted to fit the forward extension of said shank, said cavity having holes through opposite walls thereof, and said shank extension having a hole therethrough aligned with the said cavity wall holes, the hole in said shank being provided with a groove in its central portion; a bushing having a keying ring extending from its exterior surface adapted to fit in the hole in said shank with the keying ring in the groove in said hole, said bushing having a tapered hole therethrough and being radially slotted from one end; and a tapered drive pin adapted to fit in said hole in said bushing.

2. The assembly of claim 1 in which the bushing is provided with a collar at its unslotted end.

ELMER E. ROBERTSON.

REFERENCES CITED

The following references are of record in the file of this patent:

UNITED STATES PATENTS

| Number | Name | Date |
|---|---|---|
| 1,800,968 | Tomkinson | Apr. 14, 1931 |
| 1,837,341 | Shaffer | Dec. 22, 1931 |
| 1,856,930 | Robin | May 3, 1932 |
| 2,384,918 | Houk | Sept. 18, 1945 |